United States Patent
Lin et al.

(10) Patent No.: US 8,204,452 B2
(45) Date of Patent: Jun. 19, 2012

(54) TRANSMITTER AND TRANSMISSION METHOD THEREOF

(75) Inventors: Yu-Nan Lin, Taichung (TW); Kuang-Yu Yen, Taichung (TW)

(73) Assignee: Realtek Semiconductor Corp., Hsinchu (TW)

( * ) Notice: Subject to any disclaimer, the term of this patent is extended or adjusted under 35 U.S.C. 154(b) by 935 days.

(21) Appl. No.: 12/195,847

(22) Filed: Aug. 21, 2008

(65) Prior Publication Data

US 2009/0054012 A1  Feb. 26, 2009

(30) Foreign Application Priority Data

Aug. 22, 2007 (TW) .............................. 96131086 A

(51) Int. Cl.
*H04B 1/02* (2006.01)
(52) U.S. Cl. ..................... 455/93; 455/118; 375/299
(58) Field of Classification Search ............ 455/93, 455/103, 105, 118; 375/299, 300, 302
See application file for complete search history.

(56) References Cited

U.S. PATENT DOCUMENTS

| 7,515,662 | B2 * | 4/2009 | Park et al. ............... 375/350 |
| 7,567,788 | B2 * | 7/2009 | Newton et al. ........... 455/237.1 |
| 8,090,039 | B2 * | 1/2012 | Fujii ....................... 375/267 |
| 2003/0198282 | A1 * | 10/2003 | Tujkovic et al. .......... 375/146 |
| 2004/0023621 | A1 * | 2/2004 | Sugar et al. .............. 455/103 |
| 2007/0091988 | A1 * | 4/2007 | Sadri et al. .............. 375/219 |

* cited by examiner

*Primary Examiner* — Nhan Le
(74) *Attorney, Agent, or Firm* — Thomas, Kayden, Horstemeyer & Risley, LLP

(57) ABSTRACT

A signal transmission method includes: converting an input signal to generate a first converted signal having a first bandwidth, and a second converted signal having a second bandwidth; mixing the first converted signal with an oscillation signal to generate a first mixed signal, and mixing the second converted signal with the oscillation signal to generate a second mixed signal; and transmitting the first and second mixed signals by different antennas; wherein the input signal has a predetermined bandwidth, the first bandwidth is smaller than the predetermined bandwidth; and the second bandwidth is smaller than the predetermined bandwidth.

15 Claims, 7 Drawing Sheets

TRANSMITTER AND TRANSMISSION METHOD THEREOF

CROSS-REFERENCE TO RELATED APPLICATION

This application claims priority of Taiwanese Application No. 096131086, filed on Aug. 22, 2007.

BACKGROUND OF THE INVENTION

1. Field of the Invention

The present invention relates to a transmitter and a transmission method thereof, more particularly to a transmitter for wireless communication and a transmission method thereof.

2. Description of the Related Art

A wireless communication system transmits data through a channel with a predetermined frequency band. In order to reduce interference between wireless communication systems using different frequency bands, the energy outside of the frequency band used by each communication system is limited.

Referring to FIG. 1, a conventional wireless communication system that operates in a predetermined frequency band includes a transmitter 1 and a receiver (not shown) The transmitter 1 converts an input signal into an output signal, and transmits the output signal to the receiver. The transmitter 1 includes a first filter 11, a digital-to-analog (D/A) converter 12, a second filter 13, a mixer 14, a power amplifier 15, and an antenna 16. The first and second filters 11, 13 are used for making the bandwidth and energy of the output signal correspond to bandwidth and energy limitations of the predetermined frequency band. The mixer 14 is used for making a center frequency of the output signal correspond to a center frequency of the predetermined frequency band.

When the power amplifier 15 has a nonlinear effect, intermodulation will cause out-of-band energy of the output signal to increase. This problem is exacerbated by increases in the bandwidth and energy of the output signal. Additional information on intermodulation may be found on pages 14-25 of "RF Microelectronics" by Behzad Razavi. When the bandwidth and energy of the output signal are relatively small, such a nonlinear effect of the power amplifier 15 will not cause problems. However, if the energy of the output signal is increased to enlarge the range of coverage, or if the bandwidth of the output signal is increased to increase transmission data capacity, the energy of the output signal outside the predetermined frequency band (i.e., out-of-band energy of the output signal) becomes excessive, such that interference occurs with other wireless communication systems using different frequency bands.

Since there is no filter positioned after the power amplifier 15 to attenuate the out-of-band energy of the output signal and reduce the out-of-band energy of the output signal by decreasing the gain of the power amplifier 15, the coverage range of the wireless communication system is undesirably diminished.

SUMMARY OF THE INVENTION

Therefore, the object of this invention is to provide a transmitter for wireless communication and a transmission method thereof, in which an out-of-band energy of an output signal is reduced while maintaining the energy level of the output signal that is within the desired frequency band.

According to one aspect, the signal transmission method of this invention comprises: converting an input signal to generate a first converted signal having a first bandwidth, and a second converted signal having a second bandwidth; mixing the first converted signal with an oscillation signal to generate a first mixed signal, and mixing the second converted signal with the oscillation signal to generate a second mixed signal; and transmitting the first and second mixed signals by different antennas; wherein the input signal has a predetermined bandwidth, the first bandwidth is smaller than the predetermined bandwidth; and the second bandwidth is smaller than the predetermined bandwidth.

According to another aspect of this invention, the transmitter comprises: a bandwidth-converting unit for converting an input signal to generate a first converted signal having a first bandwidth and a second converted signal having a second bandwidth; a mixing unit coupled to the bandwidth-converting unit, for mixing the first converted signal with an oscillation signal to generate a first mixed signal, and mixing the second converted signal with the oscillation signal to generate a second mixed signal; and a transmitting unit coupled to the mixing unit, for transmitting the first mixed signal and the second mixed signal; wherein the input signal has a predetermined bandwidth, the first bandwidth is smaller than the predetermined bandwidth; and the second bandwidth is smaller than the predetermined bandwidth.

BRIEF DESCRIPTION OF THE DRAWINGS

Other features and advantages of the present invention will become apparent in the following detailed description of the disclosed embodiments with reference to the accompanying drawings, of which.

DETAILED DESCRIPTION OF THE DISCLOSED EMBODIMENTS

Figure 1:
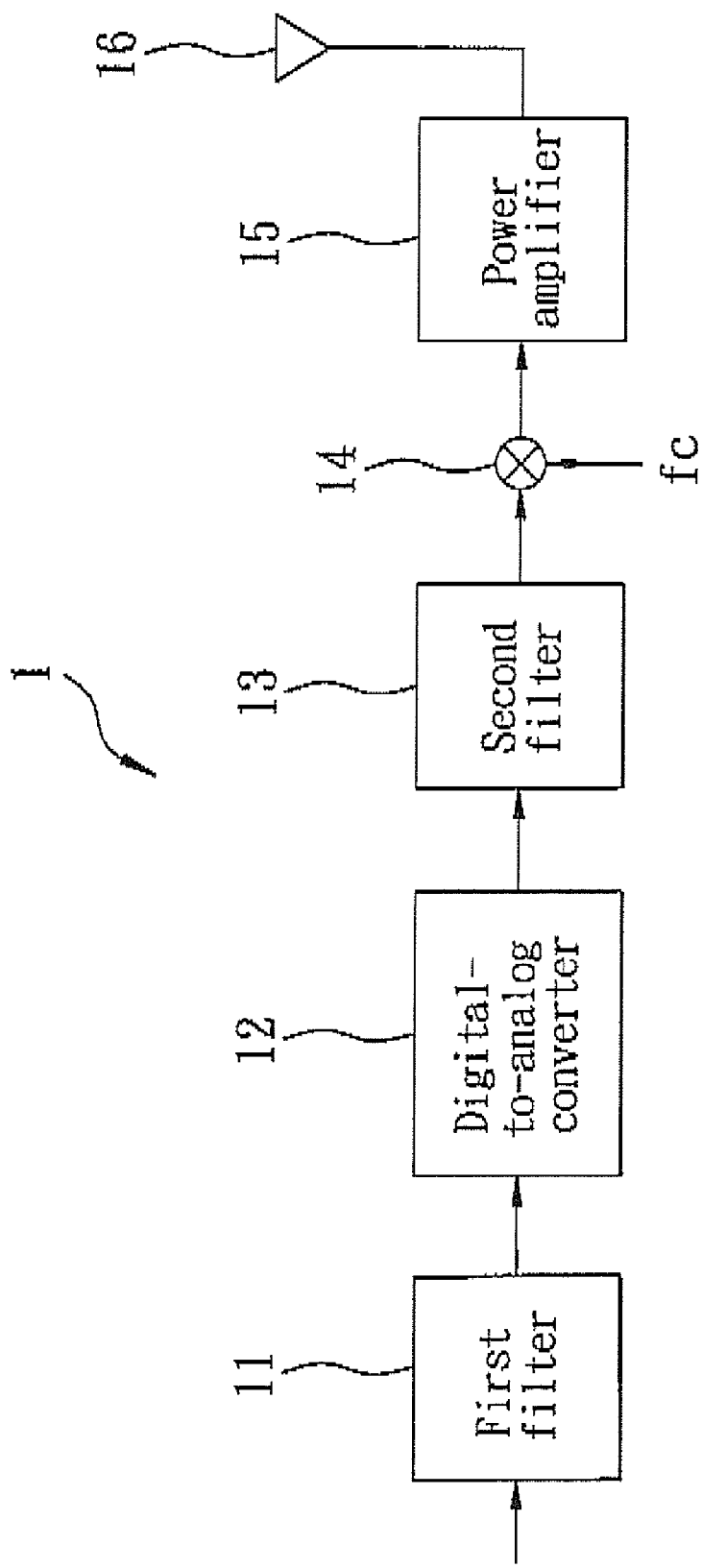
FIG. 1 is a schematic circuit block diagram of a conventional transmitter.
Figure 2:
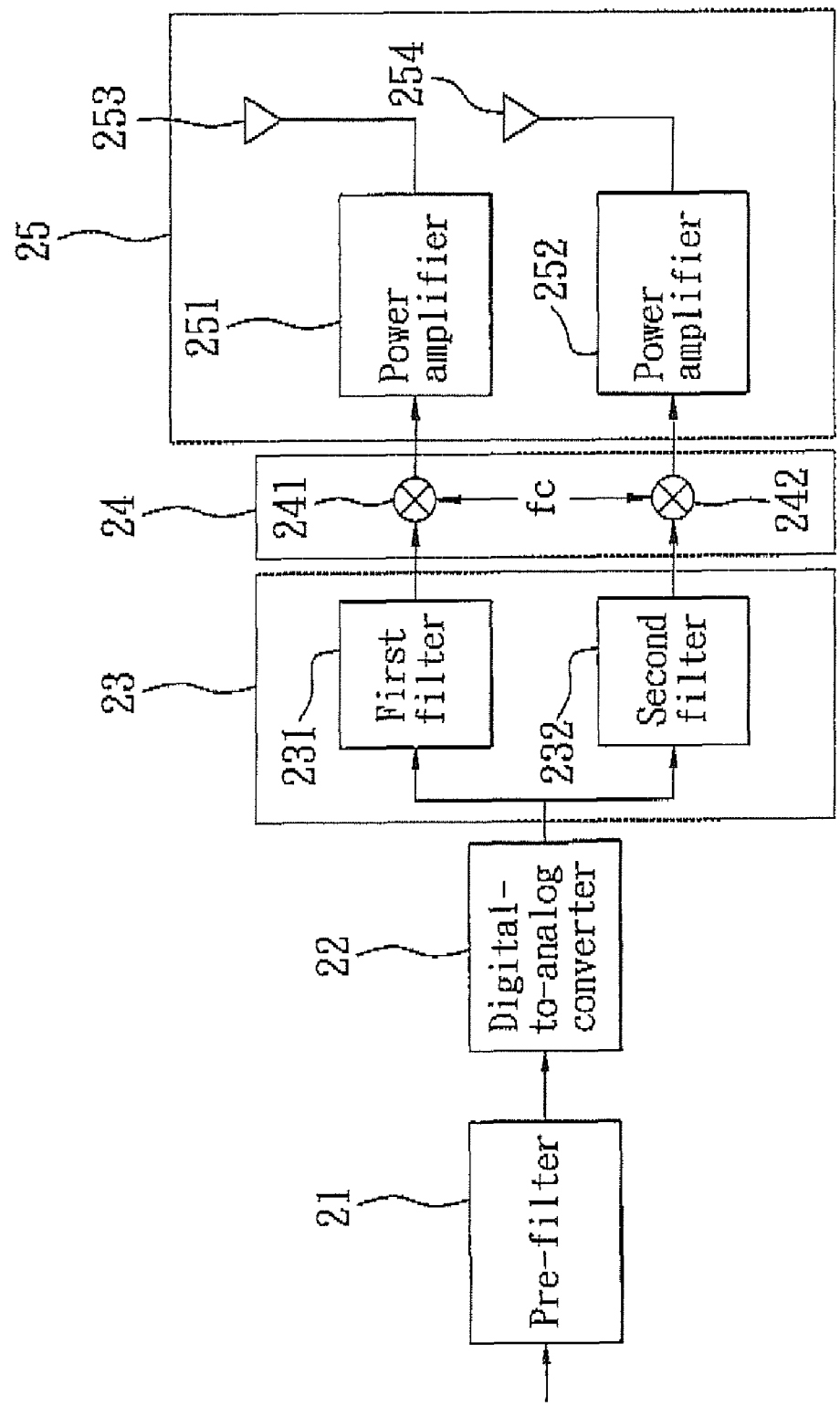
FIG. 2 is a schematic circuit block diagram of a transmitter according to a first embodiment of the present invention.

Referring to FIG. 2, a transmitter according to a first embodiment of the present invention operates in a predetermined frequency band. The transmitter includes a pre-filter 21, a digital-to-analog (D/A) converter 22 coupled to the pre-filter 21, a bandwidth-converting unit 23 coupled to the D/A converter 22, a mixing unit 24 coupled to the bandwidth-converting unit 23, and a transmitting unit 25 coupled to the mixing unit 24. In the first embodiment, the bandwidth-converting unit 23 includes a first filter 231 and a second filter 232, the mixing unit 24 includes two mixers 241, 242, and the transmitting unit 25 includes two power amplifiers 251, 252 and two antennas 253, 254.

As shown in FIG. 2, an input signal is filtered through the pre-filter 21 to obtain a filtered signal. Subsequently, the D/A converter 22 performs D/A conversion of the filtered signal to obtain an analog signal having a predetermined bandwidth.

Accordingly, the first filter 231 and the second filter 232 of the bandwidth-converting unit 23 perform bandwidth conversion for the analog signal, and respectively output a first converted signal and a second converted signal. In particular, the first filter 231 has a first frequency response for filtering the analog signal to generate the first converted signal. Similarly, the second filter 232 has a second frequency response for filtering the analog signal to generate the second converted signal. The first converted signal has a first bandwidth and the second converted signal has a second bandwidth, each of the first and second bandwidths is smaller than the predetermined bandwidth of the analog signal, and the first bandwidth is substantially equal to the second bandwidth. On the other hand, it is to be noted that a sum of the first and second bandwidths is substantially equal to the predetermined bandwidth of the analog signal.

As an example, if it is assumed that the frequency band of the analog signal is 0 Hz~40 MHz (i.e., the predetermined bandwidth is 40 MHz), the first and second filters 231, 232 may be designed to have passbands respectively of 0 Hz~20 MHz and 20 Mhz~40 Mhz. Therefore, after processing by the first and second filters 231, 232, two signals with a 20 MHz bandwidth are outputted. Accordingly, the first converted signal outputted by the first filter 231 has a frequency band of 0 Hz~20 MHz, and the second converted signal outputted by the second filter 232 has a frequency band of 20 Mhz~40 Mhz. In summary, the bandwidth-converting unit 23 is used for converting a signal with a large bandwidth into two signals with small bandwidths. Moreover, the frequency bands of the two signals do not overlap.

After bandwidth conversion, the mixing unit 24 mixes the first converted signal with an oscillation signal with frequency (fc) to thereby generate a first mixed signal, and mixes the second converted signal with the oscillation signal with frequency (fc) to thereby generate a second mixed signal. Finally, the transmitting unit 25 respectively transmits the first mixed signal and the second mixed signal by antennas 253, 254.

Figure 3:
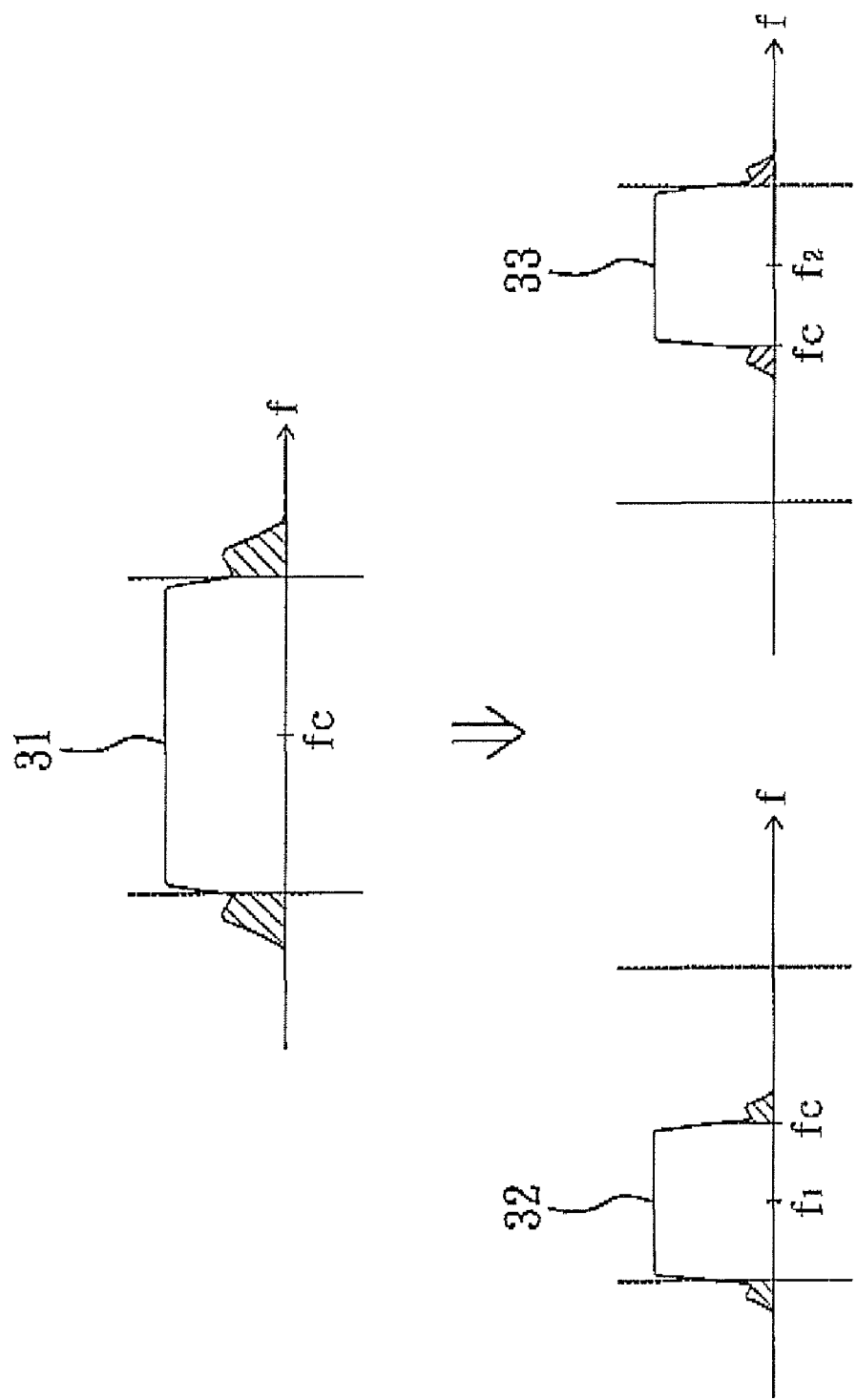
FIG. 3 shows schematic diagrams of frequency responses of the conventional transmitter and the first embodiment.

Referring to FIG. 3, curve 31 shows a frequency band of an output signal of the conventional transmitter. Curves 32, 33 show the frequency band of the output signal of the transmitter of the first embodiment. In this embodiment, the transmitting unit 25 transmits the first mixed signal with the frequency band represented by the curve 32 having a center frequency (f1) through the first antenna 253, and the transmitting unit 25 transmits the second mixed signal with the frequency band represented by the curve 33 having a center frequency (f2) through the second antenna 254. The center frequency (f1) of the curve 32 (i.e., the center frequency (f1) of the first frequency band of the first mixed signal) is smaller than the frequency (fc) of the oscillation signal, while the center frequency (f2) of the curve 33 (i.e., the center frequency (f2) of the second frequency band of the second mixed signal) is larger than the frequency (fc) of the oscillation signal.

It is evident from FIG. 2 that in the first embodiment, two small bandwidth output signals form an output signal with a full bandwidth. As a result, out-of-band energies, which are represented by the hashed-line portions in FIG. 3, can be reduced without reducing amplifier gain. In addition, since the frequency bands of the output signals are the same as the frequency band of the output signal of the conventional transmitter, a receiver can receive the output signals of the first embodiment by using its original frequency band and its original reception method.

It is to be noted that although the bandwidth-converting unit 23 of the first embodiment is described as generating two signals with small bandwidth, the present invention is not limited to such an embodiment. It is also possible for the output signals to be separated into more than two output signals. In other words, the number of output signals (N) being separated is larger than two. Furthermore, the size of (N) may be determined by the size of the predetermined bandwidth of the input signal. For example, when the predetermined bandwidth is large, (N) may be set large, and when the predetermined bandwidth is small, (N) may be set small. This makes sure that the out-of-band energy of the passbands complies with requirements.

Figure 4:
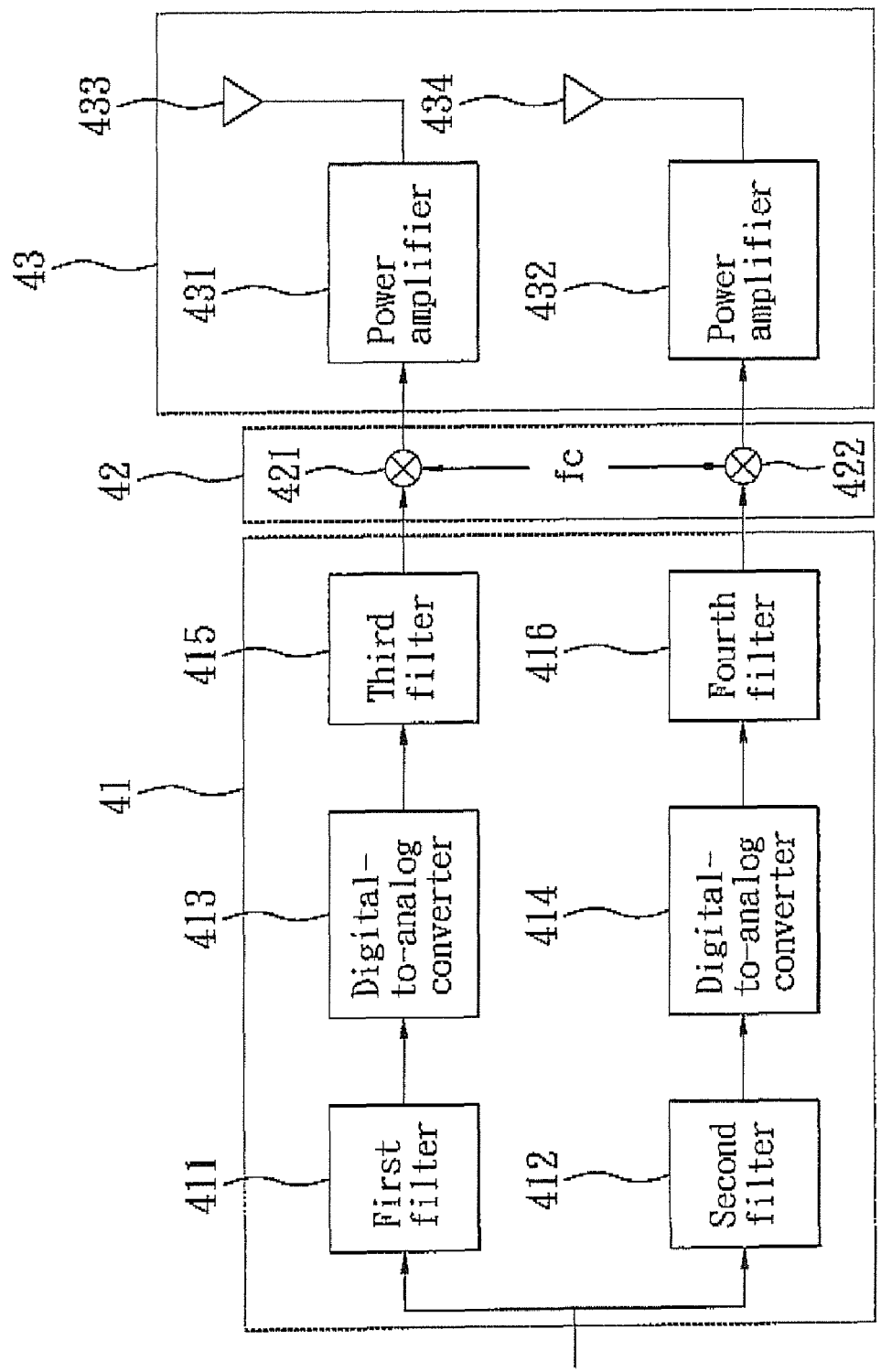
FIG. 4 is a schematic circuit block diagram of a transmitter according to a second embodiment of the present invention.

FIG. 4 shows a transmitter according to a second embodiment of the present invention. The transmitter is operated in a predetermined frequency band. The transmitter includes a bandwidth-converting unit 41, a mixing unit 42 coupled to the bandwidth-converting unit 41, and a transmitting unit 43 coupled to the mixing unit 42. In the second embodiment, the bandwidth-converting unit 41 includes first and second filters 411, 412, two D/A converters 413, 414 respectively coupled to the first and second filters 411, 412, and third and fourth filters 415, 416 respectively coupled to the D/A converters 413, 414. The mixing unit 42 includes two mixers 421, 422 respectively coupled to the third and fourth filters 415, 416. The transmitting unit 43 includes two power amplifiers 431, 432 respectively coupled to the mixers 421, 422, and two antennas 433, 434 respectively coupled to the power amplifiers 431, 432.

The first and second filters 411, 412 filter an input signal including a predetermined bandwidth. The first and second filters 411, 412 have frequency responses with adjacent passbands. Furthermore, the total bandwidth of the passbands corresponds to the predetermined bandwidth. The first and second filters 411, 412 function the same as the first and second filters 231, 232, respectively, of the first embodiment, and therefore, detailed descriptions are omitted here for brevity. The D/A converters 413, 414 respectively perform D/A conversion of the filtered signals outputted by the first and second filters 411, 412 to thereby generate analog signals. The third and fourth filters 415, 416 filter the analog signals outputted by the D/A converters 413, 414, respectively. It is to be noted that, in this embodiment, the first and second filters 411, 412 are digital filters, and the third and fourth filters 415, 416 are analog filters.

Accordingly, the mixers 421, 422 respectively mix the filtered signals outputted by the third and fourth filters 415, 416 with an oscillation signal of a frequency (fc), such that the frequency bands of the resulting mixed signals are within the predetermined frequency band. The power amplifiers 431, 432 respectively amplify the mixed signals outputted by the mixers 421, 422 to generate amplified signals, and the amplified signals are transmitted respectively through the antennas 433, 434.

As in the case of the first embodiment, the bandwidth-converting unit 41 of the second embodiment can be designed to generate more than two converted signals. In second embodiment, the bandwidths of the passbands of the first and second filters 411, 412 are the same. However, in other embodiments, the bandwidths of the passbands of the first and second filters 411, 412 may be different.

Figure 5:
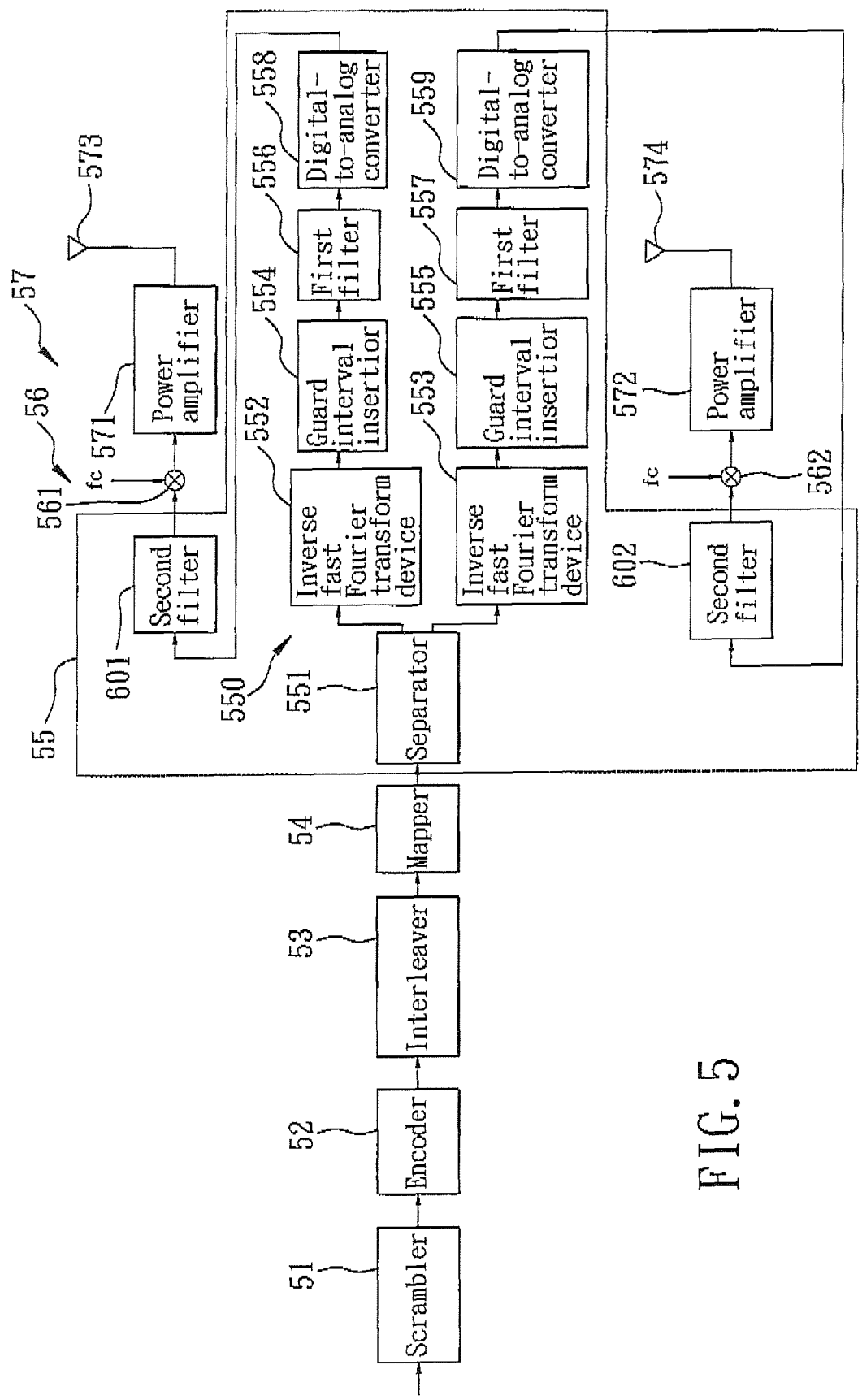
FIG. 5 is a schematic circuit block diagram of a transmitter according to a third embodiment of the present invention.

FIG. 5 shows a transmitter according to a third embodiment of the present invention. The transmitter is operated in a predetermined frequency band, and utilizes orthogonal frequency-division multiplexing (OFDM) technology. The transmitter includes a scrambler 51, an encoder 52 coupled to the scrambler 52, an interleaver 53 coupled to the encoder 52, a mapper 54 coupled to the interleaver 53, a bandwidth-converting unit 55 coupled to the mapper 54, a mixing unit 56 coupled to the bandwidth-converting unit 55, and a transmitting unit 57 coupled to the mixing unit 56. In the third embodiment, the bandwidth-converting unit 55 includes a separator 551, and a signal-processing unit 550 coupled to the separator 551. The signal-processing unit 550 includes two inverse fast Fourier transform (IFFT) devices 552, 553, two guard interval insertions 554, 555, two first filters 55G, 557, two D/A converters 558, 559, and two second filters 601, 602. The mixing unit 56 includes two mixers 561, 562. The transmitting unit 57 includes two power amplifiers 571, 572 and two antennas 573, 574.

The scrambler 51 scrambles an input signal such that the number of 0 and the number of 1 are substantially identical. The encoder 52 encodes the output of the scrambler 51. The interleaver 53 interleaves the output of the encoder 52. The mapper 54 maps the output of the interleaver 53 into a constellation diagram.

The separator 551 of the bandwidth-converting unit 55 may be a demultiplexer, which separates the output of the mapper 54 into a first data group and a second data group in accordance with the corresponding subcarriers.

The IFFT devices 552, 553 respectively perform IFFT operations on the first and second data groups outputted by the separator 551. The guard interval insertions 554, 555 respectively insert guard intervals into the outputs of the IFFT devices 552, 553 to prevent intersymbol interference (ISI). The first filters 556, 557 respectively filter the outputs of the guard interval insertions 554, 555. The D/A converters 558, 559 respectively perform D/A conversion of the outputs of the first filters 556, 557. The second filters 601, 602 respectively filter the outputs of the D/A converters 558, 559. Hence, the signal-processing unit 550 processes the first data group and the second data group to generate a first converted signal and a second converted signal.

The mixers 561, 562 respectively mix the first and second converted signals outputted by the second filters 601, 602 with an oscillation signal including a frequency (fc) to thereby generate mixed signals. Frequency bands of the mixed signals are within the predetermined frequency band of the transmitter. The power amplifiers 571, 572 respectively amplify the mixed signals outputted by the mixers 561, 552, and outputs of the power amplifiers 571, 572 are respectively transmitted through the antennas 573, 574.

Figure 6:
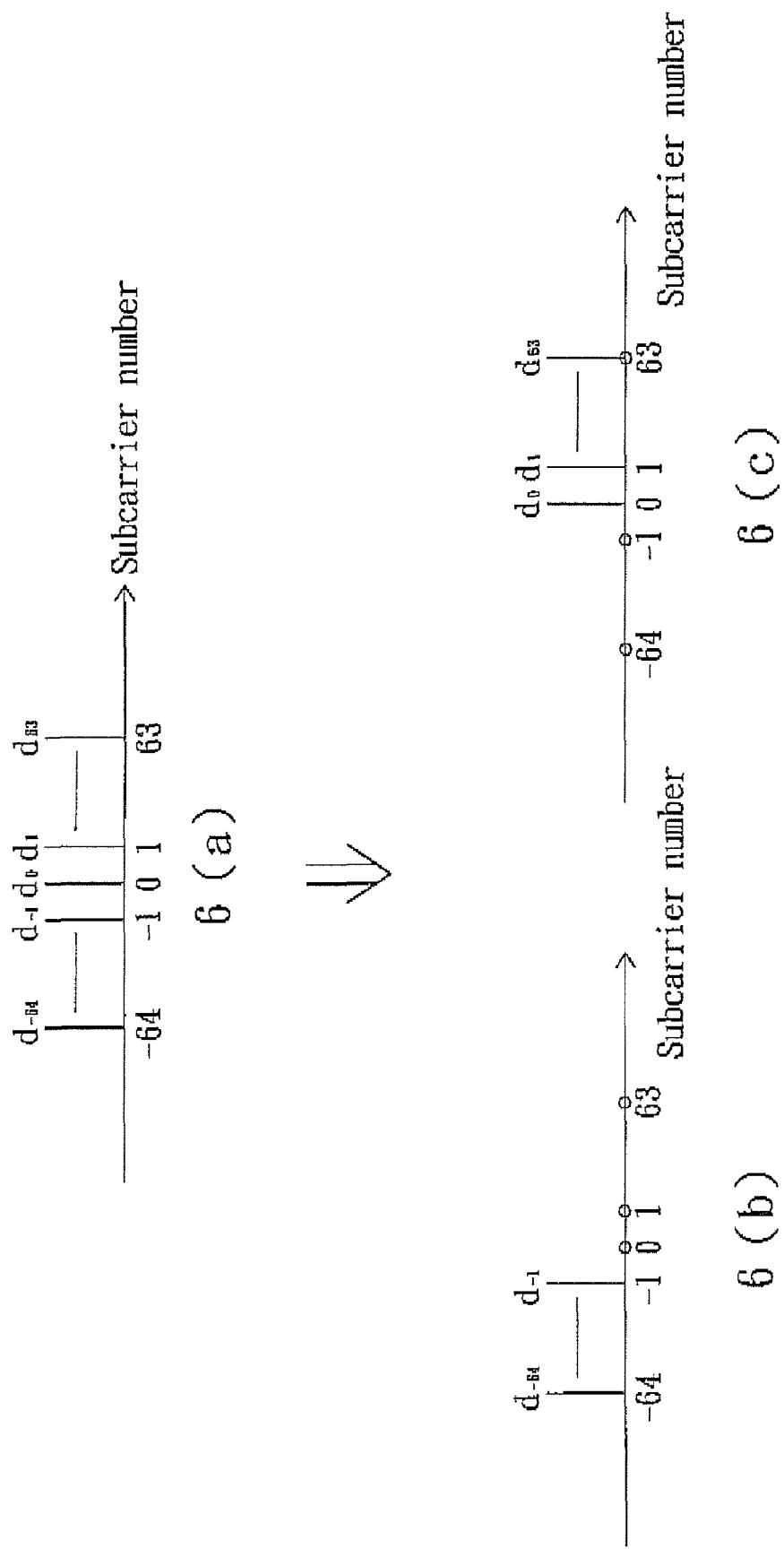
FIG. 6 shows a result of data before separation and after separation according to the third embodiment.

FIG. 6 shows a result of data before separation by the separator 551 and after separation by the separator 551. It is assumed that there are 128 subcarriers for the example shown in FIG. 6. As shown in FIG. 6(a), the bandwidth of the input signal including data $d_{-64} \sim d_{63}$ corresponds to subcarriers $-64 \sim 63$. After bandwidth conversion (i.e., data separation) by the separator 551, the input signal is separated into a first data group as shown in FIG. 6(b) including data $d_{-64} \sim d_{-1}$, and a second data group as shown in FIG. 6(c) including data $d_0 \sim d_{63}$. The first data group corresponds to a first bandwidth including subcarriers $-64 \sim -1$, the second data group corresponds to a second bandwidth including subcarriers $0 \sim 63$, and the first and second bandwidths are smaller than the bandwidth of the input signal. Since the bandwidth of the input signal has been converted, antennas 573, 574 will respectively transmit the output signals corresponding to different bands. As shown by the curves 32, 33 of FIG. 3, the separated frequency bands of the output signals are still distributed within the predetermined frequency band of the input signal.

Figure 7:
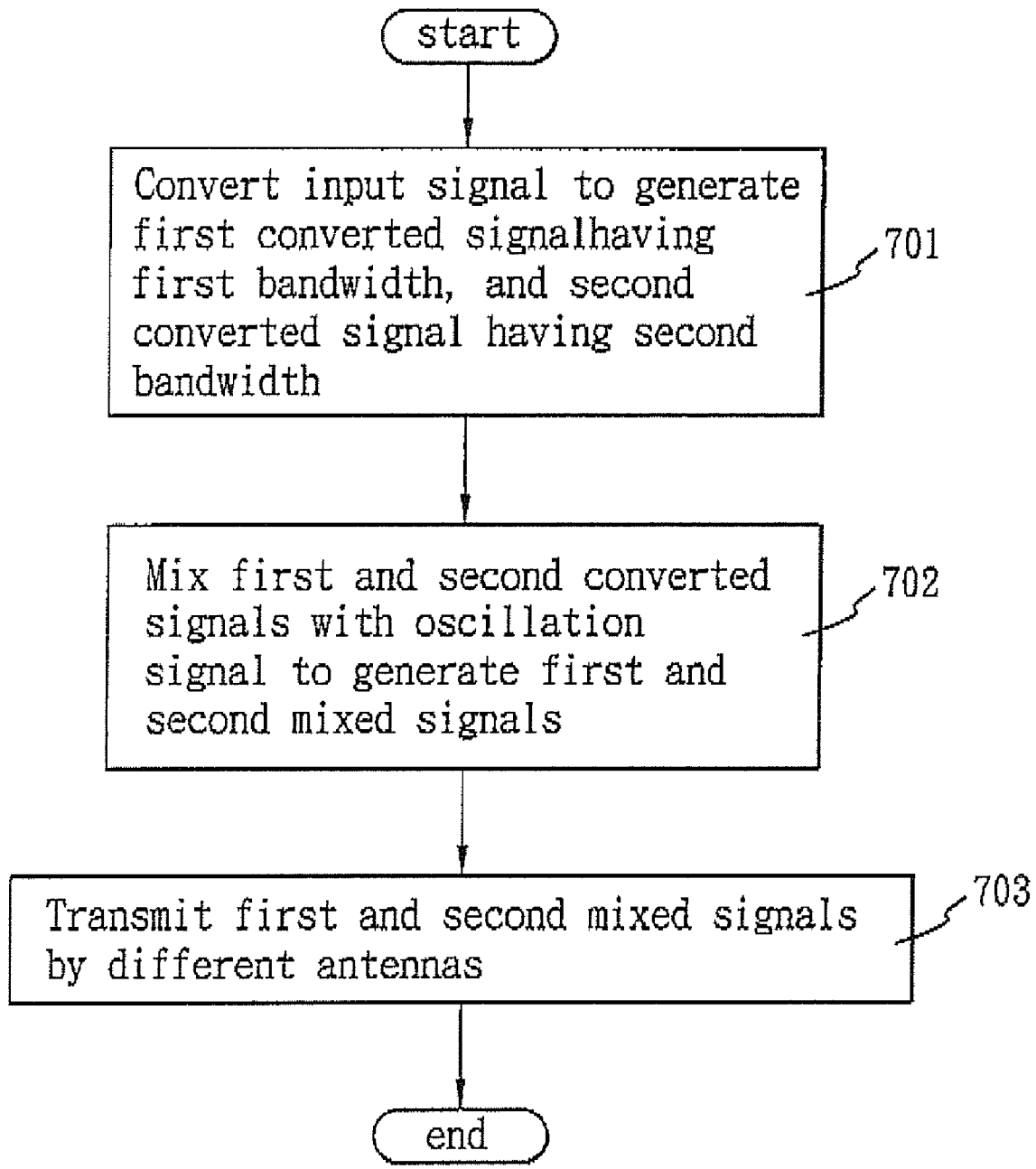
FIG. 7 is a flowchart of a signal transmission method according to an embodiment of the present invention.

The steps related to the signal transmission method according to the present invention will now be described with reference to the flowchart of FIG. 7.

First, in step 701, an input signal is converted to generate a first converted signal having a first bandwidth, and a second converted signal having a second bandwidth.

Next, in step 702, the first converted signal is mixed with an oscillation signal to generate a first mixed signal, and the second converted signal is mixed with the oscillation signal to generate a second mixed signal.

Lastly, in step 703, the first and second mixed signals are transmitted by different antennas.

In the embodiment of the transmission method, the input signal has a predetermined bandwidth, and the first bandwidth and the second are smaller than the predetermined bandwidth.

In other embodiments, the first mixed signal has a first frequency band and the second mixed signal has a second frequency band, and a center frequency of the first frequency band is smaller than the frequency of the oscillation signal and a center frequency of the second frequency band is larger than the frequency of the oscillation signal.

More details of the signal transmission method of the present invention, including different possible embodiments, are evident from the description of the transmitter of the present invention described above.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A signal transmission method comprising:
converting an input signal to generate a first converted signal having a first bandwidth, and a second converted signal having a second bandwidth;
mixing the first converted signal with an oscillation signal to generate a first mixed signal, and mixing the second converted signal with the oscillation signal to generate a second mixed signal; and
simultaneously transmitting the first and second mixed signals by different antennas;
wherein the input signal has a predetermined bandwidth, the first bandwidth is smaller than the predetermined bandwidth, and the second bandwidth is smaller than the predetermined bandwidth;
wherein the first mixed signal has a first frequency band and the second mixed signal has a second frequency band, a center frequency of the first frequency band is lower than the frequency of the oscillation signal, and a center frequency of the second frequency band is higher than the frequency of the oscillation signal.

2. The signal transmission method of claim 1, wherein the first and second bandwidths are substantially equal.

3. The signal transmission method of claim 1, wherein a sum of the first and second bandwidths is substantially equal to the predetermined bandwidth of the input signal.

4. The signal transmission method of claim 1, wherein the step of converting the input signal comprises:
filtering the input signal by a first filter and a second filter to generate the first converted signal and the second converted signal;
wherein the first filter has the first bandwidth and the second filter has the second bandwidth.

5. The signal transmission method of claim 1, wherein the step of converting the input signal comprises:
filtering the input signal by a first filter and a second filter to generate a first filtering signal, and a second filtering signal;
converting the first filtering signal and the second filtering signal by a first digital-to-analog converter and a second digital-to-analog converter to generate a first analog signal and a second analog signal; and filtering the first analog signal and the second analog signal by a third filter and a fourth filter to generate the first converted signal, and the second converted signal;

wherein the first filter and the second filter are digital filters; and the third filter and the fourth filter are analog filters.

6. The signal transmission method of claim 1, wherein the step of converting the input signal comprises:

separating the input signal into a first data group and a second data group; and processing the first data group and the second data group to generate the first converted signal and the second converted signal.

7. A signal transmission method comprising:

converting an input signal to generate a first converted signal and a second converted signal;

mixing the first converted signal with an oscillation signal to generate a first mixed signal, and mixing the second converted signal with the oscillation signal to generate a second mixed signal; and transmitting the first and second mixed signals by different antennas;

wherein the first mixed signal has a first frequency band and the second mixed signal has a second frequency band, a center frequency of the first frequency band is lower than a frequency of the oscillation signal, and a center frequency of the second frequency band is higher than the frequency of the oscillation signal.

8. The signal transmission method of claim 7, wherein the step of converting the input signal comprises:

filtering the input signal by a first filter and a second filter to generate the first converted signal and the second converted signal.

9. The signal transmission method of claim 7, wherein the step of converting the input signal comprises:

filtering the input signal by a first filter and a second filter to generate a first filtering signal, and a second filtering signal;

converting the first filtering signal and the second filtering signal by a first digital-to-analog converter and a second digital-to-analog converter to generate a first analog signal and a second analog signal; and filtering the first analog signal and the second analog signal by a third filter and a fourth filter to generate the first converted signal, and the second converted signal;

wherein the first filter and the second filter are digital filters; and the third filter and the fourth filter are analog filters.

10. The signal transmission method of claim 7, wherein the step of converting the input signal comprises:

separating the input signal into a first data group and a second data group; and processing the first data group and the second data group to generate the first converted signal and the second converted signal.

11. A transmitter comprising:

a bandwidth-converting unit for converting an input signal to generate a first converted signal having a first bandwidth and a second converted signal having a second bandwidth;

a mixing unit coupled to the bandwidth-converting unit, for mixing the first converted signal with an oscillation signal to generate a first mixed signal, and mixing the second converted signal with the oscillation signal to generate a second mixed signal; and a transmitting unit coupled to the mixing unit, for separately transmitting the first mixed signal and the second mixed signal;

wherein the input signal has a predetermined bandwidth, the first bandwidth is smaller than the predetermined bandwidth; and the second bandwidth is smaller than the predetermined bandwidth;

wherein the first mixed signal has a first frequency band and the second mixed signal has a second frequency band, a center frequency of the first frequency band is lower than a frequency of the oscillation signal, and a center frequency of the second frequency band is higher than the frequency of the oscillation signal.

12. The transmitter of claim 11, wherein the first and second bandwidths are substantially equal.

13. The transmitter of claim 11, wherein a sum of the first and second bandwidths is substantially equal to the predetermined bandwidth of the input signal.

14. The transmitter of claim 11, wherein the bandwidth-converting unit comprises:

a first filter having a first frequency response, for filtering the input signal to generate the first converted signal; and a second filter having a second frequency response, for filtering the input signal to generate the second converted signal.

15. The transmitter of claim 11, wherein the bandwidth-converting unit comprises:

a separator for separating the input signal into a first data group and a second data group; and a signal-processing unit coupled to the separator, for processing the first data group and the second data group to generate the first converted signal and the second converted signal.

* * * * *